United States Patent [19]
Taylor

[11] 3,720,463
[45] March 13, 1973

[54] MICROFICHE HOLDER

[75] Inventor: Clarence R. Taylor, Rochester, N.Y.

[73] Assignee: Eastman Kodak Company, Rochester, N.Y.

[22] Filed: Sept. 2, 1970

[21] Appl. No.: 69,053

[52] U.S. Cl. .................353/27, 353/22, 353/78
[51] Int. Cl....G03b 21/14, G03b 23/08, G03b 21/22
[58] Field of Search..................353/22, 23, 74–78, 353/120, 122, 25–27

[56] References Cited

UNITED STATES PATENTS 3,352,201 11/1967 Brownscombe..................353/27
1,937,827 9/1934 Shwantz.........................355/75

FOREIGN PATENTS OR APPLICATIONS 1,169,753 1/1959 France........................353/76

Primary Examiner—Leonard Forman
Assistant Examiner—A. J. Mirabito
Attorney—R. W. Hampton and John D. Husser

[57] ABSTRACT

A microfiche holder for a microfiche reader includes a guide surface having a series of corrugations which provide a tactile reference to the operator as he inserts a microfiche into the holder.

9 Claims, 3 Drawing Figures

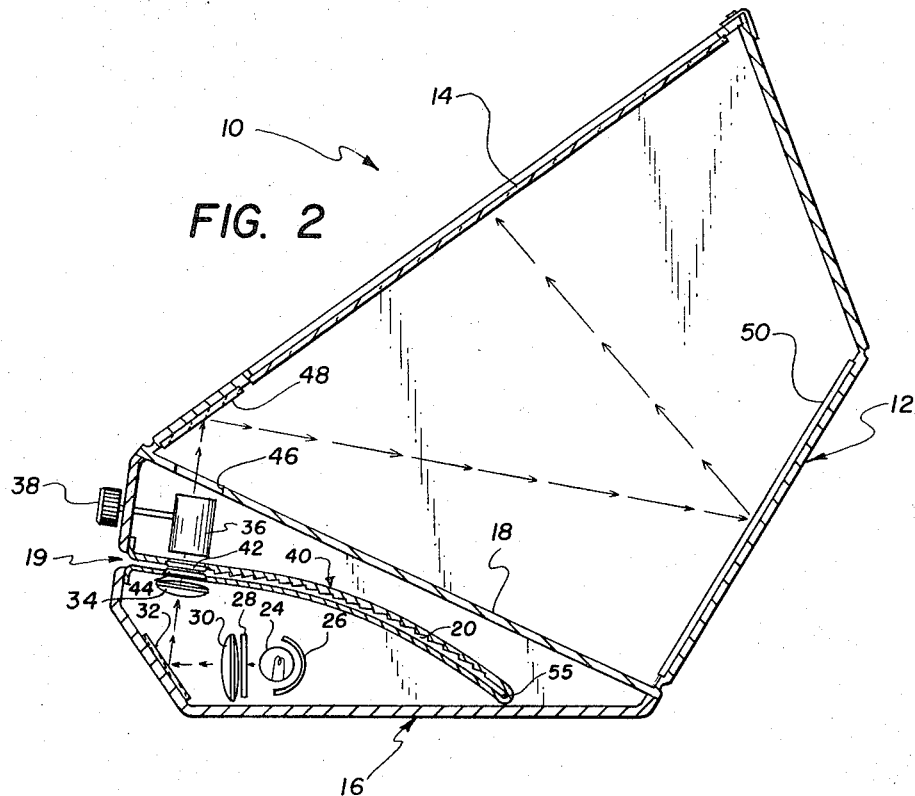
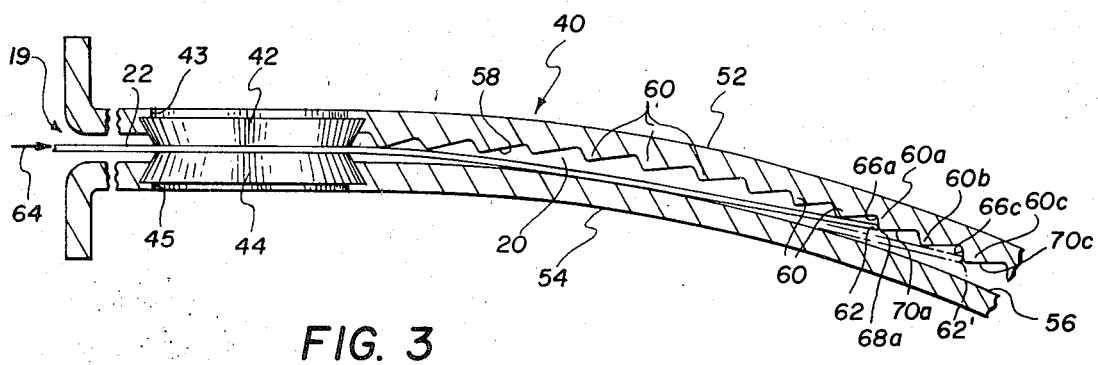

MICROFICHE HOLDER

CROSS-REFERENCE TO RELATED APPLICATIONS

Reference is made to commonly assigned copending U.S. Pat. application Ser. No. 69,074, entitled COLLAPSIBLE MICROFICHE READER, filed Sept. 2, 1970, in the name of Clarence R. Taylor, and to commonly assigned copending U.S. application Ser. No. 69,073, entitled MICROFICHE READER HAVING AN EXTERNAL CONFIGURATION FACILITATING A PLURALITY OF OPERATING ORIENTATIONS, filed Sept. 2, 1970, in the name of Clarence R. Taylor.

BACKGROUND OF THE INVENTION

1. Field of the Invention

This invention relates to microfilm viewing apparatus and more particularly to a microfiche holding device capable of receiving, movably supporting and influencing the orientation of a microfiche as inserted therein.

2. Description of the Prior Art

Microfilm viewing apparatus of the type for projecting images from image-bearing media in the form of flat sheets such as for example microfiche are generally well known. Moreover, it is well known to provide a holder or other means for supporting the microfiche in a selected orientation in a suitable plane for projection and a carriage for moving the holder within the projection plane so that images carried by the microfiche may be selectively aligned with the projection system of the apparatus. Many of such holding and aligning devices are structurally complex and therefore undesirable for incorporation in a low-cost microfilm reader.

One type of simplified microfiche holding and positioning device or gate includes a pair of transparent flats which are located in the projection light path of the reader and together define the projection plane of the reader. Such flats are usually spaced apart a distance slightly more than the thickness of a microfiche, the images of which are to be projected by the apparatus. In simple apparatus such as described, the microfiche is normally inserted, positioned and removed by hand.

One problem encountered in a simple microfiche gate or holder of this nature is that of orienting the microfiche with respect to the projection system. Because of the absence of a positioning carriage it is possible, and in fact probable, that the microfiche will not be oriented properly and that the image projected by the reader projection system will not be square with respect to the screen. Therefore, the operator will have to manipulate the microfiche until the image is square with the screen. Such an operation can only be done while the reader is in operation since it is essentially a task with the operator using the image projected on the screen as a visual reference. Such a procedure is time consuming and troublesome for the operator.

It therefore is desirable to provide a microfiche reader with a microfiche holder which is simple in construction but which eliminates the problem of maintaining proper orientation encountered in such prior art devices.

SUMMARY OF THE INVENTION

Accordingly, it is a principal object of the present invention to provide a simplified microfiche reader having improved means for facilitating the insertion, manipulation and orientation of microfiche therein.

It is a further object of this invention to provide apparatus for receiving a microfiche and holding it within the projection plane of a reader while at the same time providing the operator with a tactile reference such that the microfiche may be oriented with respect to the reader projection screen.

In accordance with the teachings of this invention, these and other objects are met by providing projection apparatus with a unique supporting and positioning structure for an information-bearing medium inserted therein. In general, this structure includes a pair of holding and guide members which are supported in opposed relation so that a portion of an image-bearing medium inserted therebetween will be positioned in the projection plane of the microfilm reader. At least one of the guide members is constructed having a surface which influences the orientation of an inserted medium.

In the embodiment of the invention disclosed below, the projection plane is defined by a pair of glass flats which are supported by the guide members. Means, such as a series of corrugations, are located on one of the guide surfaces for exerting tendency forces on one edge of the inserted medium such that a tactile reference is provided the operator without depreciably hindering movement of the microfiche by the operator while the fiche is between the surfaces of the two guide members.

The invention, and its objects and advantages, will become more apparent in the detailed description of the preferred embodiment presented below in conjunction with the accompanying drawings.

BRIEF DESCRIPTION OF THE DRAWINGS

FIG. 2 is a vertical section of the microfiche reader shown in FIG. 1, taken along line 2—2; and FIG. 3 is an enlarged cross-sectional view of the microfiche holder shown in the reader cross-section of FIG. 2 with an information-bearing medium inserted therein.

DESCRIPTION OF THE PREFERRED EMBODIMENT

Figure 1:
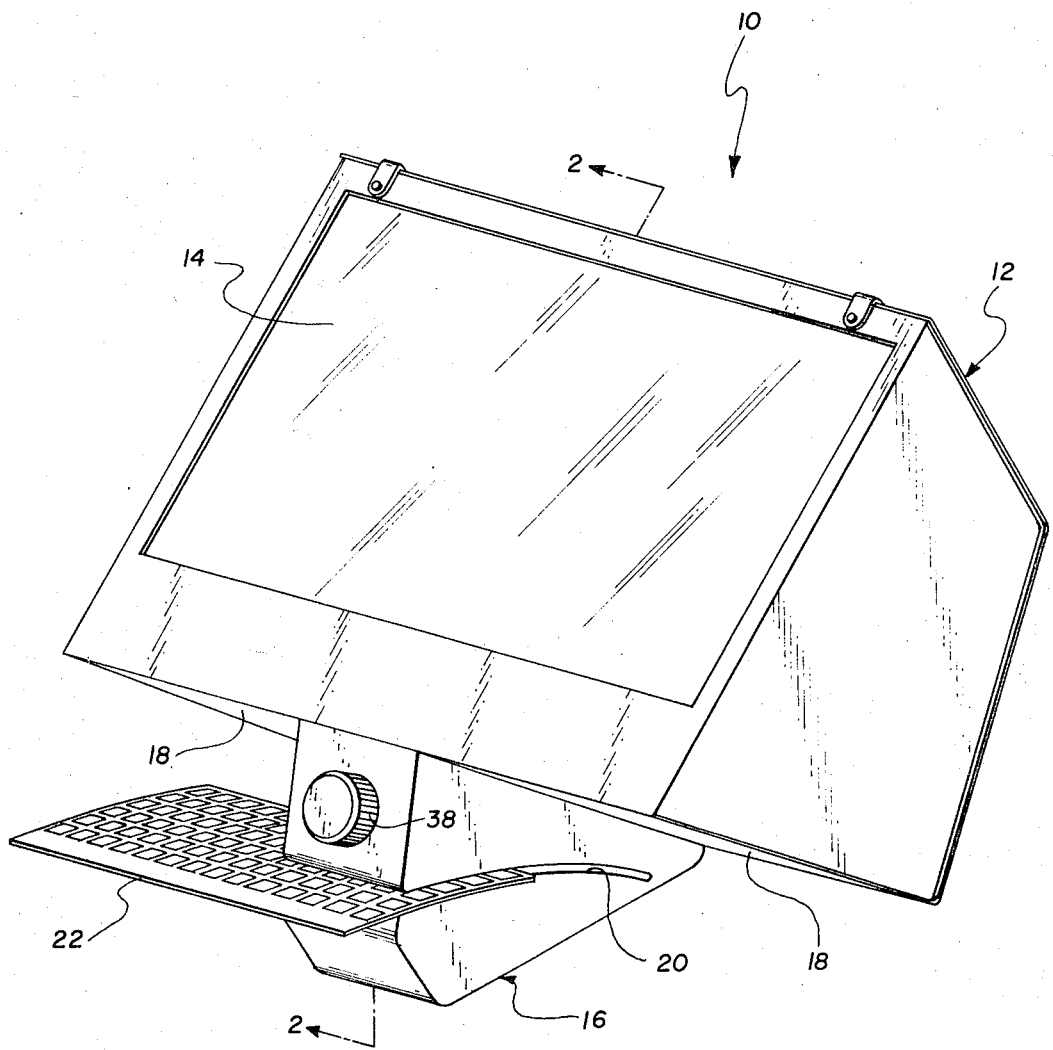
FIG. 1 is a perspective view of a small microfiche reader incorporating a microfiche holder in accordance with the teachings of this invention.

Referring now to the drawings and in particular to FIG. 1 there is shown a microfilm projection apparatus or personal microfiche reader 10 which is compact and lightweight. The housing 12 of reader 10 can be constructed so as to be rigid, or so as to be collapsible as described in the commonly assigned copending application referenced above entitled COLLAPSIBLE MICROFICHE READER. Supported by housing 12 is a rear projection screen 14 on which images are projected by the projection system of reader 10. A projector housing 16 is attached to the panel 18 of reader 10 and encloses the various projecting elements to be subsequently described in conjunction with FIG. 2. Projector housing 16 includes a slot or opening 20 into which microfilm in sheet form may be inserted for projection. In the illustration of FIG. 1 a microfiche 22 is shown inserted in slot 20. It will be understood that the present invention is not limited to use with microfiche but also is adaptable to other forms of microfilm in sheet form such as, for example, aperture cards.

The construction of microfilm reader 10 is more clearly shown in the cross-sectional view in FIG. 2. The projecting elements of film reader 10 supported within projection housing 18 include a light source or lamp 24, a reflector 26, a heat glass 28, condenser lens elements 30 and 34, a mirror 32, a projection lens 36 and a focusing knob 38 which is used to focus the image projected on screen 14 by the projection system. Film gate 40 is also supported by projector housing 16. In operation, light from lamp 24 and reflector 26 is transmitted through heat glass 28 and condenser element 30 to mirror 32 as indicated by the arrows in FIG. 2. The light is reflected by mirror 32 through condenser element 34 to projection lens 36. After refraction by projection lens 36, the light passes through aperture 46 in panel 18 to a mirror 48 mounted within housing 12 where it is reflected to a second mirror 50 within housing 12 which in turn reflects the light to the rear projection screen 14.

An enlarged and more detailed illustration of film gate 40 in partial cross-section is depicted in FIG. 3. Film gate 40 includes a pair of transparent plate elements or flats 42 and 44 which are serially aligned with condenser lens element 34 and projection lens 36. Flat 42 is mounted in an aperture 43 located in holding member or guide 52, and flat 44 is mounted in an aperture 45 located in holding member of guide 54. Flats 42 and 44 are positioned in an opposed relationship so as to define between them the projection plane of reader 10. Flat 42 is spaced from flat 44 a distance sufficient to allow an image-bearing medium such as a microfiche to be inserted between the flats, but it is spaced close enough to flat 44 so as to maintain such an inserted medium substantially within the defined projection plane. Flats 42 and 44 may be constructed of any suitable transparent material such as, for example, glass or plastic.

Guide members 52 and 54 which support flats 42 and 44 are likewise supported by projector housing 16 in an opposed relation, thereby defining opening or slot 20 into which an image-bearing medium is inserted for projection. At one end 55 of slot 20, members 52 and 54 are joined together in any suitable manner. Between flat 44 and end 55, the inner surface 56 of member 54 is curved, being convex in shape. The opposed surface 58 of member 52 is likewise generally curved between flat 42 and end 55, being concave in shape and generally complementary to surface 56. However, unlike surface 56 which is relatively smooth, surface 58 is corrugated, having a series of parallel ridges 60 which are oriented generally perpendicular to the direction of insertion, that is, a direction running generally from the entrance 19 of slot 20 to the end 55 of slot 20. Although surface 58 is shown in the instant embodiment as consisting of a series of ridges 60 which are best shown in FIG. 3, it will be understood that any number of shapes would suffice to perform the function which is to be subsequently described below without departing from the scope of the invention.

Reference is made to FIG. 3 so that the operation of film gate 40 can be more completely explained. As can be seen in FIG. 3 a portion of microfiche 22 is shown inserted within film gate 40 between flats 42 and 44 and members 52 and 54. The curvature of members 52 and 54 is slightly exaggerated for purposes of illustration. It can be seen that because of the curvature of members 52 and 54, microfiche 22 is caused primarily to lie against smooth surface 56. However, the leading edge 62 of microfiche 22 is caused to bear against the opposite corrugated surface 58. Therefore, as microfiche 22 is inserted into holder 40 by the operator in a direction as indicated by arrow 64, leading edge 62 will successively bear against ridges 60. For example, in FIG. 3, leading edge 62 is shown abutting front surface 66a of ridge 60a. The resistance which surface 66a applies to edge 62 to resist the forward movement of microfiche 22 as it is inserted into holder 40 by the operator provides the operator with a tactile reference via the microfiche so that he experiences a feeling of squareness of the microfiche with respect to the ridges and therefore with respect to the projection system of reader 10. For instance, if microfiche 22 is inserted into slot 20 with leading edge 62 at an acute angle to ridge 60a, edge 62 will contact the front surface 66a of ridge 60a at one point only, rather than along the entire length of ridge 60a or edge 62. As the operator continues to move the fiche into slot 20, front surface 66a resists movement of edge 62 at the original point of contact. The rest of edge 62 which does not contact surface 66a will continue to move, rotating about the original point of contact, until the entire edge 62 is substantially in contact with surface 66a. As the operator applies more force to microfiche 22 the leading edge 62 will then ride up over the apex 68a of ridge 60a and rest on back surface 70a of ridge 60a until it encounters ridge 60b where the same process is again repeated. In FIG. 3, leading edge 62' is shown in dotted line bearing against front surface 66c of ridge 60c after having passed ridge 60b. Each encounter of the leading edge of microfiche 22 with the front surface of a ridge 60 of corrugated surface 58 is a tactile reference for the operator thus enabling him to square the fiche with respect to the projection system without having to energize projection lamp 24.

Microfiche 22 is lightly held in film gate 40 by both the close spacing of flats 42 and 44 which are spaced just slightly more than the thickness of a microfilm sheet and also by the curvature and spacing of members 52 and 54. Because of this curvature and the complementary relationship of members 52 and 54, when microfiche 22 is inserted into slot 20, it is flexed sufficiently to develop restoring forces within the microfiche itself, causing portions of it to bear against surfaces 56 and 58 as was described above. Movement of the microfiche is thereby retarded when it is released from the operator's grasp. As can be seen from FIG. 3, by guiding the microfiche to follow a path of simple curvature (turning in one direction), continuing flexure occurs with further microfiche insertion. If desired, a covering of fabric pile or other material can be applied to the surfaces of members 52 and 54 in the areas immediately surrounding flats 42 and 44 to prevent the scratching of a microfiche when inserted therebetween. A fabric pile covering can also be applied to smooth surface 56 of member 54 for the same reason. In fact, such a covering is desirable although it is not necessary to the operation of this invention.

Although it is contemplated that the ridges 60 of corrugated surface 58 will run transverse to the direction of insertion of the microfiche as in the preferred embodiment where they are perpendicular to such direction, this is not particularly necessary since they may be positioned at an angle to the direction of insertion. Even if this is the case their function is still the same, i.e., to provide a tactile reference for the operator so that he can orient the microfiche with respect to the projection system of the microfilm reader 10, even though such orientation is other than square with respect to reader 10.

It is apparent from the foregoing description that film gate 40 as described is a relatively simple device with no moving parts thereby contributing to a relatively service free and long product life. Although its simple design lends it readily for incorporation into readers of the small and compact variety, nevertheless it may be incorporated into larger readers where there is the desire and/or necessity for a simple and reliable microfiche holder.

The invention has been described in detail with particular reference to preferred embodiments thereof, but it will be understood that variations and modifications can be effected within the spirit and scope of the invention.

I claim:

1. In projection apparatus having a projection plane and means for projecting a selected image from a medium bearing plural images which is located in the projection plane, an improved device for orienting the medium at each of a plurality of image-projecting positions relative to the projecting means comprising:

means for receiving such medium in the projection apparatus;

means for supporting a portion of a received medium substantially in the projection plane;

means associated with said receiving means for releasably engaging a received medium at each of a plurality of image-projecting positions in the projection plane to provide a tactile reference via the received medium for indicating the orientation of the medium with respect to the projection means at a selected one of said plurality of image-projection positions;

said means for receiving including first and second spaced, opposed guide means defining a path of simple curvature extending from said means for supporting, said first and second guide means being spaced from each other a distance such that an image-bearing medium inserted therebetween is flexed to create restoring forces within the medium, said forces tending to straighten the flexed medium and urge the medium against said medium engaging means.

2. In projection apparatus having a projection plane and means for projecting a selected image from a medium bearing plural images which is located in the projection plane, an improved device for orienting the medium at each of a plurality of image-projecting positions relative to the projecting means comprising:

means for receiving such medium in the projection apparatus;

means for supporting a portion of a received medium substantially in the projection plane;

means associated with said receiving means for releasably engaging a received medium at each of a plurality of image-projecting positions in the projection plane to provide a tactile reference via the received medium for indicating the orientation of the medium with respect to the projection means at a selected one of said plurality of image-projecting positions;

said means for receiving including means defining a pair of spaced opposed, complementary curved surfaces extending from said means for supporting, one of said curved surfaces being convex in shape and the other of said surfaces being concave in shape, said curved surfaces of said defining means being spaced from each other a distance such that an image-bearing medium inserted therebetween is flexed to create restoring forces within the medium, said forces tending to straighten the flexed medium thereby maintaining the position of the medium between said curved surfaces.

3. The invention as defined in claim 2 wherein said supporting means includes a pair of transparent plate elements supported on either side of the projection plane and spaced from each other a distance so as to substantially maintain in the projection plane a portion of an image-bearing medium inserted between said plate elements.

4. The invention as defined in claim 2 wherein said tactile reference providing means includes a series of corrugations on said concave surface of said defining means.

5. In combination with projection apparatus of the type having a projection plane and means for projecting an image from an image-bearing medium located in the projection plane, the improvement which comprises:

a. a pair of transparent plates supported on either side of the projection plane, said plates being spaced from each other a distance such that the portion of an image-bearing medium inserted therebetween is maintained substantially in the projection plane;

b. a first guide member having a generally convex guide surface extending from one of said transparent plates;

c. a second guide member having a generally concave guide surface extending from the other of said transparent plates and supported in closely spaced, opposed relation to said first guide member, said concave and convex guide surfaces being opposed and generally complementary so that an image-bearing medium inserted between said guide surfaces is flexed to create forces in the inserted medium, which forces tend to bias the leading edge of the inserted medium against said concave guide surface; and d. means on said concave guide surface for exerting forces on the leading edge of an inserted medium which is biased against said concave guide surface so as to tend to orient the medium in a predetermined orientation with respect to said projecting means.

6. The invention defined in claim 5 wherein said force exerting means includes a series of corrugations in said concave guide surface, said corrugations running substantially transverse to the direction of insertion of the image-bearing medium.

7. Apparatus for holding a flexible image-bearing medium in the projection plane of a projector, said apparatus comprising:
   a. a first holding member having a concave surface and including means defining a first aperture through which light can be projected, said first holding member being supported in said apparatus so that said first aperture defining means is located on one side of the projection plane;
   b. a second holding member having a convex surface and including means defining a second aperture through which light can be projected, said second holding member being supported in said apparatus so that said second aperture defining means is located on a side of the projection plane opposite said first aperture defining means with said second aperture aligned with said first aperture, said convex surface spaced in opposed relation from said concave surface a distance so that an image-bearing medium inserted therebetween is flexed by said surfaces, thereby causing the leading edge of the inserted medium to be biased against said concave surface; and
   c. means on said concave surface for influencing the orientation of an inserted image-bearing medium when its leading edge is biased against said concave surface.

8. The invention as defined in claim 7 further including first and second transparent plates respectively mounted in said first and second apertures and spaced apart a distance such that the portion of an image-bearing medium inserted therebetween is maintained substantially in the projection plane.

9. Apparatus for holding a flexible image-bearing medium in the projection plane of a projector, said apparatus comprising:
   a. a first guide member having a concave surface and a first aperture;
   b. a second guide member having a convex surface and a second aperture, said second guide member supported adjacent said first guide member with said second aperture aligned with said first aperture and with said convex surface spaced in opposed relation from said concave surface a distance such that an image-bearing medium inserted therebetween is flexed, thereby causing the leading edge of the inserted medium to be biased against said concave surface and thereby tending to maintain the position of the inserted medium between said first and second guide members;
   c. first and second transparent members respectively mounted in opposed relation in said first and second apertures and spaced apart a distance such that the portion of an image-bearing medium inserted therebetween is maintained substantially in the projection plane; and
   d. a series of corrugations incorporated into said concave surface for influencing the orientation of an inserted image-bearing medium when its leading edge is biased against said concave surface.

* * * * *